United States Patent [19]

Goto

[11] 4,165,519

[45] Aug. 21, 1979

[54] OPTICAL CONTROL SYSTEM FOR READ OUT FROM INFORMATION RECORDING MEDIUM

[75] Inventor: Kenjiro Goto, Urawa, Japan

[73] Assignee: Mansei Kogyo Kabushiki Kaisha, Saitama, Japan

[21] Appl. No.: 758,464

[22] Filed: Jan. 11, 1977

Related U.S. Application Data

[63] Continuation-in-part of Ser. No. 492,531, Jul. 29, 1974, abandoned.

[51] Int. Cl.² ............................ H04N 5/76; G11B 7/12
[52] U.S. Cl. ............................... 358/128; 179/100.3 V
[58] Field of Search ............... 179/100.3 V, 100.4 IL; 358/128; 250/201, 202, 203 R, 206, 555, 557, 559, 561, 216, 566, 568, 570, 571, 234; 365/120, 124

[56] References Cited

U.S. PATENT DOCUMENTS

| | | | |
|---|---|---|---|
| 3,673,412 | 6/1972 | Olson | 179/100.3 V |
| 3,829,622 | 8/1974 | Elliot | 179/100.3 V |
| 3,876,841 | 4/1975 | Kramer et al. | 179/100.3 V |
| 3,876,842 | 4/1975 | Bouwhuis | 179/100.3 V |
| 3,932,700 | 1/1976 | Snopko | 179/100.3 V |

*Primary Examiner*—Raymond F. Cardillo, Jr.
*Attorney, Agent, or Firm*—Oblon, Fisher, Spivak, McClelland & Maier

[57] ABSTRACT

An optical control system for information read out of video and/or audio information optically recorded in a track on the surface of a disc-shaped information medium, wherein a lightbeam is focused into a spot of predetermined transverse dimension at the locus of impingement thereof with the plane of the track and selectively deflected transversely along an edge of the track. Deviations of the light spot from the edge of the track is detected and corrected by means of feedback servo-system to maintain the light spot properly situated on the track edge. The servo-system also corrects for focus deviations in the predetermined transverse dimension of the light beam.

8 Claims, 25 Drawing Figures

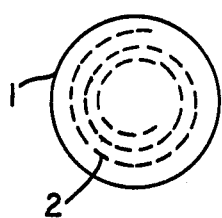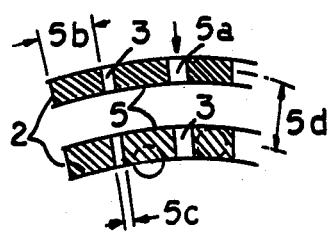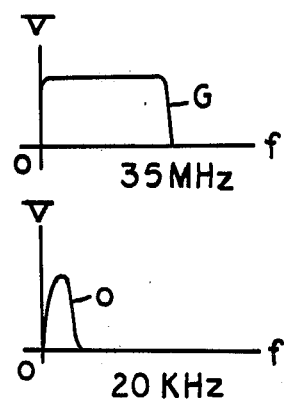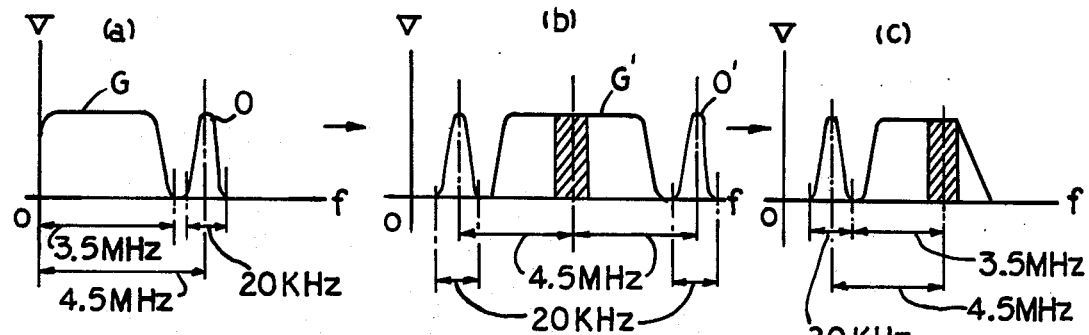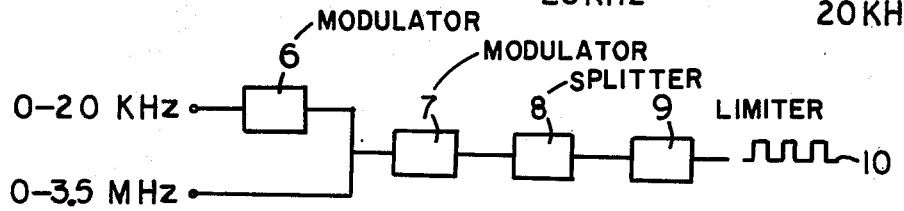

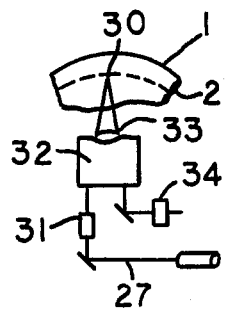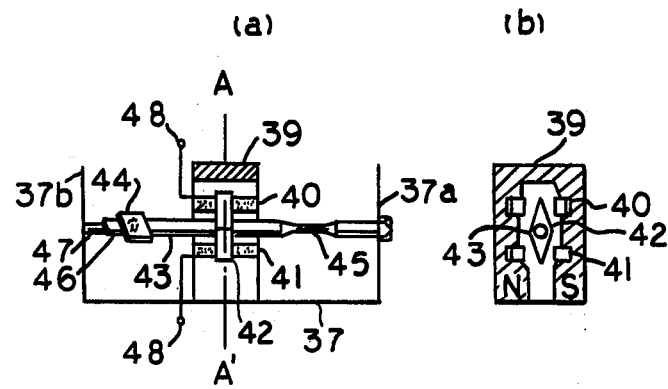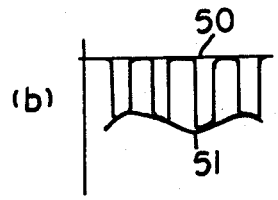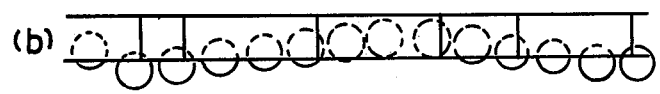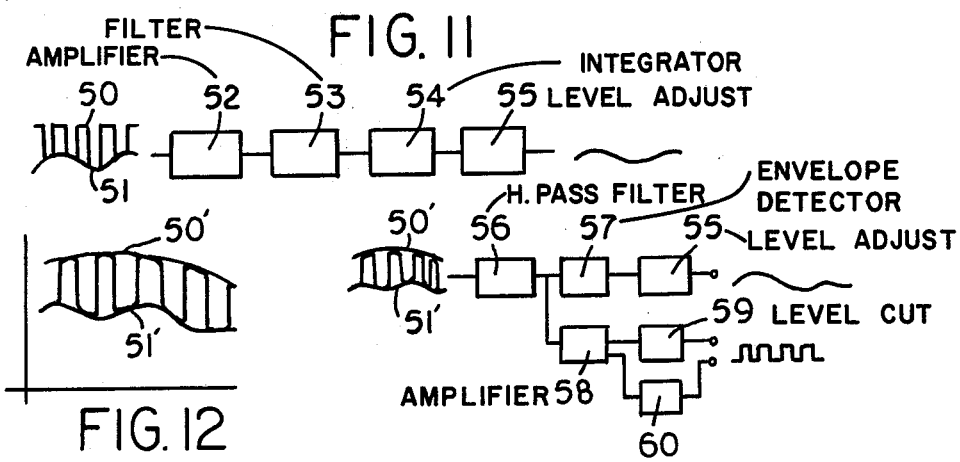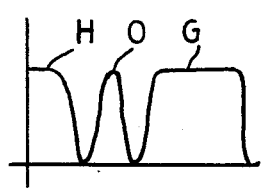

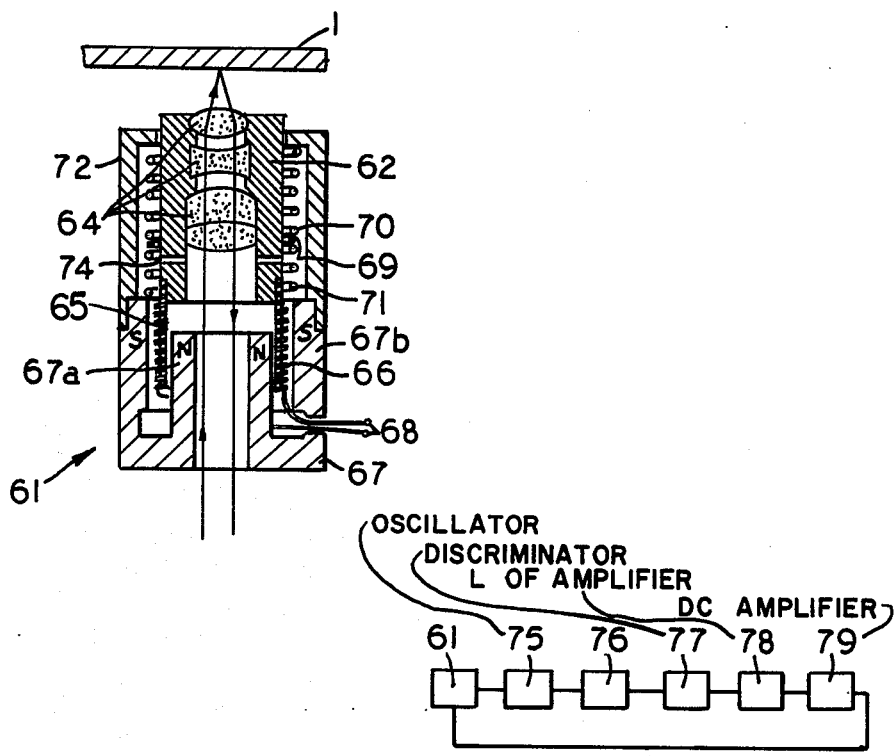
FIG. 15
FIG. 16
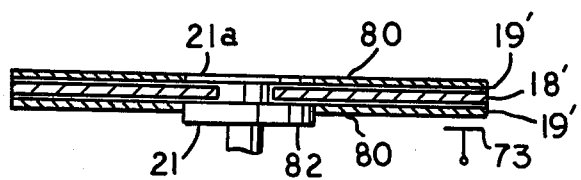
FIG. 17

FIG. 22
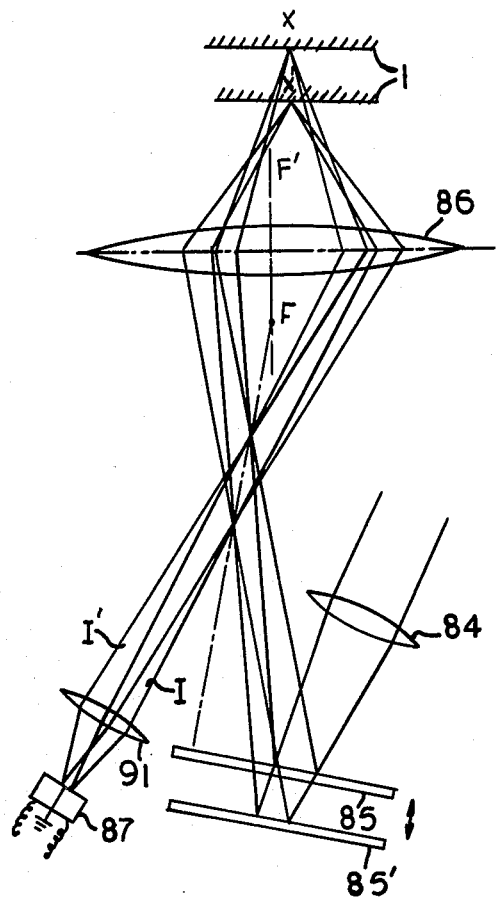
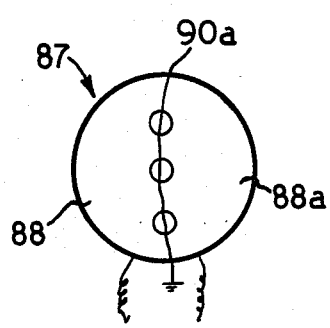
FIG. 25
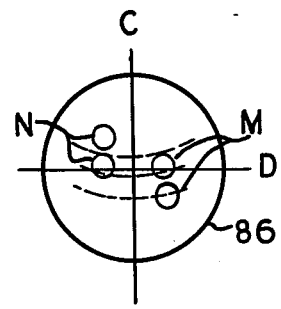
FIG. 21

FIG. 23
FIG. 24
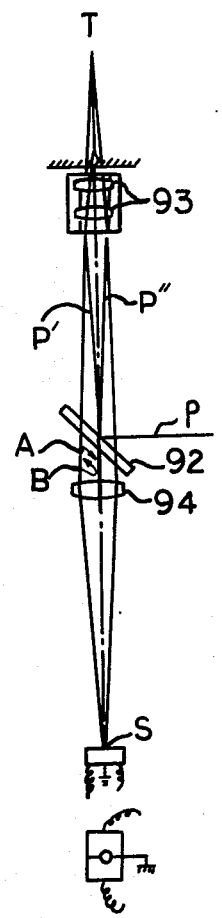
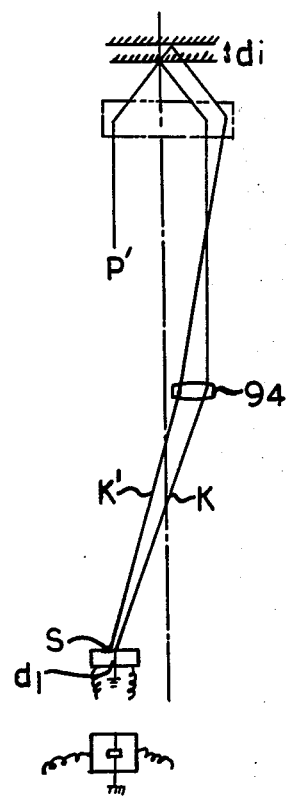

OPTICAL CONTROL SYSTEM FOR READ OUT FROM INFORMATION RECORDING MEDIUM

This application is a continuation-in-part of my application Ser. No. 492,531, filed July 29, 1974, now abandoned.

This invention generally relates to the read out of video-audio information recorded on disc-shaped information storage media and particularly to an improved optical control system for read out apparatus employing a light beam such as a laser.

One object of the present invention is to provide a new and improved read out system which is adapted to read out information recorded at high density. Another object of the present invention is to provide a read out system which permits an accurate and minute control of the light beam intermediate the light beam generating device and the disc-shaped information storage medium whereby the condensed light beam spot is correctly and selectively focused on only one of the information storage tracks on the information storage discs. Still another object of the present invention is the provision of a read out system in which a unitary light beam is projected onto and reflected from the information storage track on an information storage disc and which also includes a photo-sensitive receptor means, such as photo diode or similar sensing element, that is responsive to the reflected light beam and provides control signals that are indicative of the nature and magnitude of departures from a predetermined tracking relationship between the impinging beam and the information storage track that are also indicative of departures from a predetermined focusing relationship between the impinging beam and the information storage track for initiating a return to desired tracking relation and desired focussed relation therebetween. A still further object of the present invention is the provision of a read out system in which is unitary reflected light beam from an information storage track on an information storage disc includes discrete control signals indicative of the tracking relation of said unitary light beam with said track, discrete control signals indicative of the focusing relation between said unitary light beam and said track and further signals representative of the video and audio information on said track with such signals being of selective, mutually independent and non-interfering character. Still further objects and advantages of the present invention will become apparent from the embodiments now to be described.

The invention will now be described with reference to the accompanying drawings wherein:

FIG. 1 is a schematic plan view of a disc-shaped information storage medium;

FIG. 2 is a fragmentary plan view, on an enlarged scale, of a portion of the information storage tracks of the disc-shaped information storage medium of FIG. 1;

FIG. 3 is a schematic representation showing illustrative video and audio signals;

Figure 6:
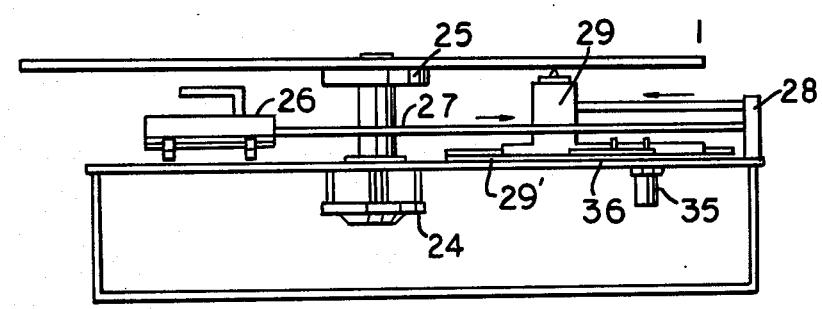

FIGS. 4(a), 4(b) and 4(c) are schematic illustrations showing the development of the composition of video and audio signals;

FIG. 5 is a schematic block diagram of a suitable circuit for converting video and audio information into a pulse signal;

FIG. 6 is a side view of a read out device;

FIG. 7 is a schematic illustration of a pick-up device;

FIG. 8(a) is a fragmentary side elevational view, partly in section, of a light beam deflecting device;

FIG. 8(b) is a cross-sectional view taken on line A—A' of FIG. 8(a);

FIGS. 9(a) and 9(b) are schematic representations of the wave shapes of outputs of a photo diode;

FIGS. 10(a) and (b) are schematic representations showing the nature of beam spot impingement on information storage tracks;

FIG. 11 is a simplified schematic block diagram of a circuit whereby a control signal indicative of divergence between a beam spot and a desired overlap thereof on an information storage track is separated from an output of a photo diode;

FIG. 12 is a schematic representation of a wave shape of the output of a photo diode that is illustrative of the influence of the reflected light from a disc-shaped information storage medium;

FIG. 13 is a simplified schematic block diagram of a circuit by which a control signal indicative of divergence between a beam spot and an information storage track is separated from an output of a photo diode;

FIG. 14 schematically shows a frequency spectrum of a video, audio and a control signal;

FIG. 15 is a vertical sectional view of an automatic beam spot focusing device;

FIG. 16 is a simplified schematic block diagram of a circuit for controlling the automatic focusing device shown in FIG. 15.

Figure 18:
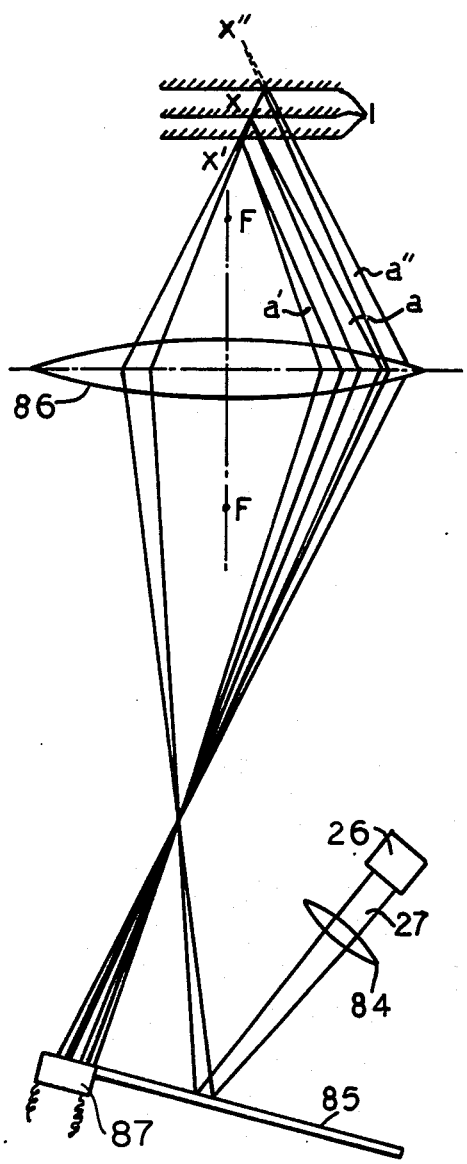
Figure 20:
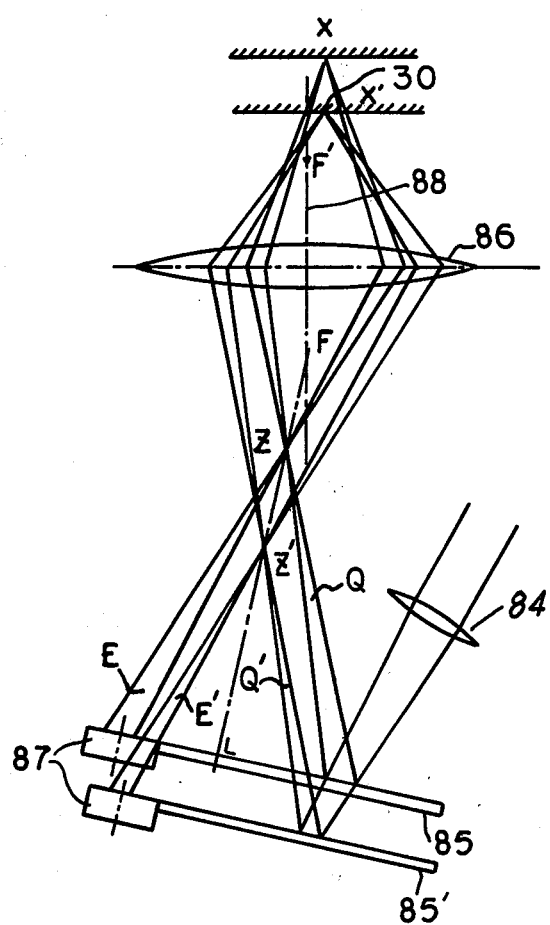
Figure 19:
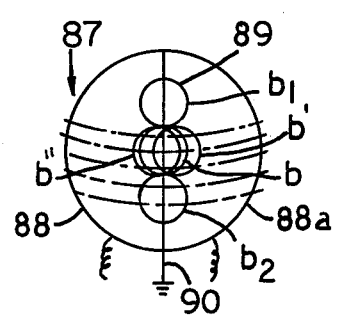

FIG. 17 is a side elevation, partly in section, showing the multilayer construction of a disc-shaped information storage medium;

FIG. 18 is an optical schematic diagram showing a first alternative embodiment of an automatic focusing device;

FIG. 19 is a schematic plan view showing the spots of a light beam incident upon differential photo diode;

FIG. 20 is an optical schematic diagram showing a second alternative embodiment of an automatic focusing device;

FIG. 21 is a schematic plan view showing the relation between an incident light beam and a reflected light beam on a lens;

FIG. 22 is an optical schematic diagram showing a third alternative embodiment of an automatic focusing device;

FIG. 23 is an optical schematic diagram showing a fourth alternative embodiment of an automatic focusing device;

FIG. 24 is a view in which the optical axis of light beam shown in FIG. 23 is observed from the side of FIG. 23; and FIG. 25 shows the ununiform junction of a differential photo diode.

Referring initially to FIG. 1, there is shown a disc-shaped information storage medium 1 (hereinafter referred to as a "disc") on two sides of which video and audio information is recorded on and in the form of spiral information storage tracks 2 (hereinafter referred to as a "track"). FIG. 2 illustrates a portion of the tracks 2 on an enlarged scale. The track 2 carries the recorded information in the form of a signal bit portion 5 of a first predetermined reflectivity, as for example in the nature of a low reflecting area, which is separated from the succeeding bit 5 by an area of second predetermined and contrasting reflectivity, as for example, in the nature of a high reflecting area 3. The radial width 5a of the signal bit portions 5 is constant, while the length 5b of such signal bit portions 5 and the spaces 5c between adjacent bit portions 5 in the spiral direction of the track 2 are of variable dimension thereby permitting recordation of intelligence and information. The present invention should not be limited to the above mentioned example since, as will be apparent, similar recording can be achieved by positioning a highly reflective signal bit in an area of low reflectivity or by an absorptive signal bit in a light passing area, and vice versa.

By way of further example, such disc 1 has a 30 cm diameter and turns at 30 r.p.s.; the pulse repetition of the signal bits portion 5 is 5 to 7 MHz; each side of the disc is played for 30 to 40 minutes. Accordingly, in order to reproduce video and autio information of the NTSC System or of the PAL System (in this case 25 r.p.s.), it is preferable that the length 5b of the bit portions 5 be at least two microns; that the space 5c between successive bits 5 be about two microns; that the width of the track 5a be about one micron and that the pitch 5d between the tracks be about two microns. FIG. 3 schematically shows an illustrative video signal "G" (0~3.5 MHz) and an audio signal "0" (0~20 MHz), respectively. As shown in FIGS. 4 and 5, the video signal and audio signal 6 are composed into one composite signal 7, by modulation of the carrier wave of 4.5 MHz in such manner that the audio signal and the video signal can be later separated from the composite signal. A person is more sensitive to the distortion of the audio signal rather than that of the video signal. Therefore, it is desirable that the audio signal should be recorded in a low frequency band so as to improve that signal-to-noise ratio of the audio signal. When the frequency modulation 8 of the composite wave is carried out with relatively small frequency deviation, the composite wave has side bands (frequency spectrum) symmetrically to the center frequency, as shown in FIG. 4(b). In the side band, a portion of upper side-band O', G' of each of the audio and the video signals is eliminated as shown in FIG. 4(c). This FM wave is converted to a pulse FM9 by a limiter circuit thereby forming one information pulse 10 as shown in FIG. 5.

FIG. 6 shows the essentials of suitable mechanical construction for a read out device for reading out information recorded on the disc 1 as above described. As there shown, the turntable 25 is driven to rotate the disc 1 thereon at a substantially constant speed by a motor 24 (for example, in the case of video signals for the NTSC system, 30 r.p.s. is the most preferable). A light beam generating device, generally designated 26 and suitably comprising a laser, emits a light beam 27 which eventually reaches a pickup device 29 through a reflecting mirror 28. The positional disposition of the reflecting mirror 28, the light beam generating device 26 and the pickup device 29 is so arranged that (a) a portion of a reflected light beam from the reflecting mirror 28 does not re-enter the light beam generating device 26 and that (b) the light beam emitted from the light beam generating device 26 does not interfere with the reflecting light beam.

With reference to FIGS. 6 and 7, a preferred construction for the pickup device 29 assembly comprises a beam deflecting device 31 for deflecting the light beam 27 in the range of minute angles so as to correctly project the light beam spot 30 in desired incident relation upon the track 2, an automatically operable beam spot focusing device 32 for keeping a projected desired and constant diameter of the light beam spot 30 impinging on the surface of the disc 1 and an associated focusing lens 33 for focusing the light beam 27 into the desired diameter of minute spot 30. The pickup device assembly 29 is arranged to be reciprocably displaceable in the radial direction along a guide bed 29' through an idler 36 suitably in the nature of a rack and pinion driven by an auxiliary motor 35. A photo-diode detector assembly 34 is also included in the pickup assembly 29 to convert into discrete electric signals the variations in the intensity of the light beam reflected from the disc 1.

Referring now to FIG. 8, there is shown a preferred construction for a light beam deflecting device. Mounted on a base plate 37 is a permanent magnet assembly, generally designated 39, inside of which electromagnetic coils 40 and 41 are fixed on the upper and lower portions thereof, respectively. The coils 40 and 41 are wound continuously with a single lead wire 48 in the same winding direction. In the center of the coils 40 and 41 is arranged a diamond-shaped armature element 42 mounted on a torsion axle assembly generally designated 43. The torsion axle assembly 43 includes an elongate axle member fixedly secured at one end to a side wall 37a of the base plate 37 and having a reflector mirror 44 mounted thereon. The other end thereof is provided with a cone-shaped groove 46 rotatably engaging a fixed pivot 47 mounted on the other side wall 37b. The torsion axle assembly 43 includes a fine or reduced diameter portion 45 to be employed as a torsion spring.

In operation of the described unit, energization of the coils 40 and 41, as effected by current flow therethrough, effects a displacement of the armature 42. The direction and magnitude of the displacement of the armature 42 is determined by the magnitude and direction of the current flow through the coils. In such manner, the opposing motor and torsion forces operate to selectively determine the degree of rotative displacement of the mirror 44 which is determinative of the position of the light beam reflectable therefrom.

Such light beam is projected on the information track on which the video and audio information is recorded with modulation such as a pulse frequency modulation, a pulse width modulation and the like in which the amplitude of a carrier wave is constant. The reflected light beam from the track is thus convertable into an electrical signal by a suitable signal detector such as a photo-diode.

A typical output of the photo-diode, when the beam spot is continuously positioned on a track edge with constant dimensions as shown in FIG. 10(a), is shown in FIG. 9(a). In a similar manner, when there is a fluctuation of the beam spot relative to the track edge as shown in FIG. 10(b), the output of the photo-diode 34 will be as shown in FIG. 9(b). As shown in FIGS. 9(a) and 9(b), the reference numeral 50 is indicative of the magnitude of the output of the photo-diode 34 as determined by the high reflecting areas on the disc and the reference numeral 51 represents the output of the photo-diode 34 that results from the scanning of the low reflecting areas thereon. Accordingly, when the beam spot 30 fluctuates toward and into a high reflecting area, the level of the output 51 becomes higher. Similarly, when the beam spot 30 fluctuates toward and into a low reflecting area, the level of the output 51 becomes lower. These differences of these output levels can be employed as a control signal by which the beam deflecting device is controlled to prevent the beam spot departing from the track.

A control system which generates such a control signal based on the difference in output levels as the beam spot departs from the track edge has been previously disclosed in U.S. Pat. No. 2,838,683 to Munro.

Thus, in order to determine the direction of the fluctuation of the beam spot from the track, a base setting position of the beam spot is selected. This base setting position is predetermined to any position of the beam spot where the beam spot lies on the edge of the track, and can be on either of the inner or outer edge of the track. However, in each apparatus, the base setting position is pre-assigned to one of the two edges, i.e. in the basic design of the apparatus. Then the output of the photo-diode where the beam spot is on the base setting position is predetermined to be a "basic output".

The operation of the control system is now described assuming that a signal bit in the track forms a high reflecting area with respect to other part of the disk, that the base setting position of a beam spot is predetermined to the outer edge of the track, and that the tracking system in the apparatus deflects a beam outwardly (inwardly) if the envelope signal is higher (lower) than the basic output.

In this apparatus, if there is a fluctuation of the beam spot relative to the track and in this case if the envelope signal is higher than the basic output, this shows that the beam spot fluctuates inwardly from the outer edge of the track in comparison with the selected base setting position of the beam spot. Therefore, a beam is deflected outwardly by the tracking control system so that the beam spot is controlled to lie on the base setting position on the track outer edge.

If there is another fluctuation of a beam spot relative to the track and in this case if the envelope signal is lower than the basic output, this shows that the beam spot fluctuates outwardly from the outer edge of the track in comparison with the selected base setting position of the beam spot. Therefore, the beam is deflected inwardly by the tracking control so that the beam spot is controlled to lie on the base setting position at the track edge.

Conversely, the apparatus can be constructed to pre-assign the base setting position to the inner edge of a recorded track. In this case, the apparatus is so constructed that a beam spot is deflected inwardly (outwardly) if the envelope signal is higher (lower) than the basic output.

In either of the possible beam spot direction control implementations, the possiblity exists that the beam spot may occasionally and inadvertently be deflected completely to the track edge opposite the base setting track edge. In that event, the beam spot will either be deflected to lie on the base setting track edge, or deflected to the adjacent track where the beam spot will then be appropriately centered on the tracking edge of the adjacent track.

FIG. 11 is a schematic circuit block diagram of the essentials of such a control system. As there illustrated, the output of the photo-diode 34 is amplified by an amplifier 52. The amplified output thereof is divided into the upper portion 50 of the output envelope and the lower portion 51 of the output envelope by an appropriate filter circuit 53. The lower output portion 51 is transformed into a discrete output signal referred to first envelope output signal by a suitable integration circuit 54. In such manner, the tracking signal, which is indicative of the difference between the envelope output and a basic output level, corresponding to a base setting position where the beam spot is correctly on the track, is obtained by a suitable level adjusting circuit 55. If necessary, high frequency noise may be eliminated from the tracking signal by a suitable high frequency filter or the like. The resultant tracking signal is thus utilizable to operate the beam deflecting device to control the beam spot 30.

Generally, the fluctuation in the reflection factor of the disc at various parts thereof is determined by the production and the treatment of the disc. In a severe case, the fluctuation of the reflection factor may well be larger than the fluctuation of the signal level that results from the scanning of the information track portions thereof. Therefore, the magnitude of the signal that results from both the low reflecting portion 51' and the high reflecting portion 50' may fluctuate as shown in FIG. 12. Such operative phenomenon may also be caused when the output intensity of the light beam generating device fluctuates. In such a case, a control circuit shown in FIG. 13 is employed. The pulse portion of the sensed signal is initially separated from the composite output of the photo-diode by a high-pass filter 56. Then, such pulse portion is transformed into an output referred to as an envelope signal by an envelope detector 57 so that the tracking signal, which is the difference between the output envelope signal and a basic output is obtained by a level adjusting circuit 55. Further, the pulse output is shunted for amplification to amplifier 58 and subsequent detection as a normal video signal by a level cut circuit 59 or by a circuit 60 for refining a wave-shape. Since the output of the photo-diode includes the video information signal, the audio information signal and a controlling signal having the tracking signal, the control system of the read out device is influenced by the nature and character of the information signals. Accordingly, in this control system of interest, a frequency band H, which is fixed by the characteristics of a mechanical and electrical closed loop in the controlling system for deflection, is so arranged that a frequency band "O" of the audio signal, a frequency band "G" of the video signal and the frequency band "H" of the controlling signal including the tracking signal should not be in the same frequency range. They should be discrete with respect to each other as shown in FIG. 14.

Referring now to FIGS. 15 and 16, there is shown a construction for an automatic light beam focusing device 61 which is adapted to maintain the focus of a light beam on the disc 1 independent of the vertical motion of the disc 1. As illustrated, the automatic focusing device 61 comprises a permanent magnet 67, a casing 72 fixedly mounted on the permanent magnet 67, a hollow member 62 reciprocably disposed within the casing 72 that includes a peripheral flange 69 on the outer surface at about the mid length thereof, a pair of biasing springs 70, 71 arranged within the casing and on either side of the flange 69 to displaceably support the hollow member 62 within the casing 72, a multi-element combination lens means 64 mounted within the hollow member 62 to focus the light beam at a predetermined position at the surface of the disc 1, and a metallic sleeve 65 fixedly secured to the dependent end of the hollow member 62 having a coil 66 disposed in surrounding relation therewith and with its terminals 68 extending outwardly of the permanent magnet 67. The permanent magnet 67 is preferably formed to provide an inner cylindrical core portion 67 (*a*) disposed within said metallic sleeve 65 and an outer cylindrical portion 67 (*b*) sized to encompass and surround the metallic sleeve 65. These inner and outer cylindrical portions of the magnet 67 form a magnetic field therebetween. The hollow member 62 is adapted to be supported within said casing 72 at a rest position by equal tensioning of the springs 70 and 71. As will be apparent, the hollow member 62 may be supported with two spring means which possess somewhat different degrees of tension without prejudice to the minute movement of the hollow member 62. The metallic sleeve 65 is preferably made of a metal which is not only light in weight but also possessed of high thermal conductivity and an aluminum sleeve, for example, is preferred. The detector plate is made of a suitable electrically conducting metal and includes a flat surface disposed essentially in parallel facing relation with the surface of the disc 1. As shown, the hollow member 62 includes a transverse air passage 74 through the wall thereof through which air may be introduced by the reciprocating movement of the hollow member 62 to cool the sleeve 65 and coil 66.

In operation, a control signal indicative of the nature and magnitude of a variation in the spacing between the focusing lens 64 and the track on the disc 1 is applied to an oscillator 75 and the frequency of oscillation of the oscillator circuit 75 varies accordingly. Such frequency variation of the oscillator 75, which is proportional to the magnitude of displacement of the disc 1, is amplified by a high frequency amplifier 76 and is picked up as a variation of the output of the FM discriminator circuit 77. This variation is then further amplified by a low frequency amplifier 78 to be further amplified by a direct current amplifier 79 as a signal whose magnitude is representative of the difference between the magnitude of the variation and a predetermined standard voltage and thereby to be transformed into the input signal for the automatic focusing device 61. Such an input signal controls a current flowing into the coil 66 on the sleeve 65 to control the magnitude of the upward and downward displacement thereof by the magnetic field of the permanent magnet 67 so as to correctly focus the light beam 27 on the disc 1. Because of the closed loop nature of the circuit of FIG. 16, the light beam 27 can be continuously controlled to be properly focused on the disc 1.

In a system employing the principles of this invention, it is preferable to employ a dual surfaced information storage disc of the following type. Referring to FIG. 17, a preferred disc construction comprises a base plate 18' of glass or synthetic resin having on both surfaces thereof a very thin vaporized metallic film 19' of aluminum or copper suitably configured to accurately present the recorded information. Because the slightest injury to the surface of the disc will cause noise in the reproduced signal that detracts from the accuracy of the recorded signals, the surfaces of the disc are coated by a film of optically transparent material 80 to minimize, if not prevent, injury thereto. The pickup device is preferably arranged adjacent the undersurface of the disc to read out the information contained in the track on the lower surface thereof. With such undersurface sensing, the variation of the disc thickness does not change the elevational level of the lower surface of the disc relative to the pickup device. Thus, the distance between the disc and the surface of the lens in the pickup device is not influenced by the variation of the thickness of either the disc or the coating film 80. A locking element 21(a) is removably engageable with the turntable 21 to fixedly maintain the disc securely mounted thereon.

The embodiments illustrated in FIGS. 18, 20, 22 and 23 and hereinafter described comprise various optical sensing systems for providing the requisite control signals for an automatic focusing device as shown in FIG. 15 and described above. In each of these alternative embodiments control of the beam spot and correction thereof is effected by means of optical sensing. Referring initially to FIG. 18, there is shown an automatic focusing embodiment that controls the light beam spot by the displacement of a main focusing lens. As illustrated, a light beam 27 emitted from a light beam generating device 26, such as a laser, is reflected after passage through a first lens 84 by a reflecting mirror 85 through a second lens 86 for focusing on the disc surface. When the light beam 27 is properly focused on the disc 1, the reflected beam from the disc 1 is projected back through the second lens 86 on to the responsive surface of a differential photo-diode 87 fixedly mounted on the reflecting mirror 85. As shown in FIG. 19, the differential photo-diode 87 is made of two photo-diodes 88 and 88a joined each other in such a manner as to provide a common line junction 90 connected to ground. The two photo-diodes 88 and 88a have discrete output terminals. When the light beam is focused correctly on the disc, the reflected beam spot is projected equally on the receptor surfaces of the photo-diodes 88 and 88a and there is no differential voltage output across the output terminals thereof. If the operative surface of the disc 1 is displaced from X to X' or moves up from X to X", the reflected light beams a' and a" will be condensed at the beam spots b' and b" on the photo-diode 87, respectively. As will be described, the beam spot on the photo-diode is thus displaced in accordance with the vertical motion of the disc to produce a differential voltage whose polarity is indicative of the direction of disc displacement and whose magnitude is indicative of the magnitude of the displacement. The differential output between photo-diodes 88 and 88a is thus utilized to control the positioning of the second lens 86 to correctly re-focus the light beam 27 on the disc surface, whereas the total output of the both photo-diodes 88 and 88a is employed to control the beam deflecting device in the pickup device to correctly track the signal bit portions.

As shown in FIGS. 18 and 21 if the incident point "N" of the light beam on the second lens 86 is deviated from the optical axis of the second lens 86 in the direction parallel to the track on disc 1, the light beam reflected by the disc 1 will pass through the lens 86 at the point "M" which is substantially diametrically opposed to "N" as shown in FIG. 21. The second lens 86 is positioned in parallel relationship with the disc 1 set on the turntable. If the disc 1 moves up and down during the rotation thereof as illustrated in FIG. 18, the focus of the light beam will be displaced forward and backward of the disc 1. This displacement of the focus causes the point "M" on the lens 86 to move in parallel relationship with direction of the track. In FIG. 21, a line "D" shows the direction of the track. As will be seen, the movement of the point "M" on the lens 86 shows that the light beam reflects on a different spot on the lens 86, and the passage of the reflected light beam through such different spot is detected by the differential photo-diode 87, which then actuates a corrective displacement of the lens 86 of the automatic focusing device to accurately re-focus the light beam on the disc.

In addition to automatic focusing, the light beam should be controlled for the purpose of tracking. The deflecting device is adapted to deflect the light beam in a direction at right angles to the direction "D" so as to control the beam tracking on the disc 1. Thus, a reflected light beam spot "M" on the lens 86 is moved in the direction "C" by the deflecting device and simultaneously in the direction "D" by the automatic focusing device so that the focusing control and tracking control do not interfere mutually as shown in FIG. 21. Referring again to FIG. 19, the common junction line 90 of the differential photo-diode 87 is arranged at a right angle with the direction of the track. Thus, while the movement of the beam spot on the lens 86 in the direction "D" causes the beam spot to move to b' and b", for example, on the differential photo-diode 87 at right angles with respect to the junction 90, the movement of the beam spot on the lens 86 in the direction "C" causes the beam spot to move to b1 and b2, for example, on the differential photo-diode 87 on and along the junction 90.

Referring now to FIG. 20, there is shown a second alternative embodiment of an automatic focusing device and in which the position of the light beam spot is controlled by the movement of a reflecting mirror 85. The reflecting mirror 85 is here so arranged that it is positioned at right angles with an extension which joins the focus F of the second lens 86 with points Z and Z' at which the light beam is focused by the first lens 84. If the disc 1 moves down from X to X', the reflecting mirror is driven from 85 to 85' by the differential output of the differential photo-diode 87 substantially in the direction of the optical axis of a reflected light beam Q or Q' so as to move a beam spot 30 in parallel with an optical axis 88 of the second lens 86. The differential photo-diode 87 fixed on the reflecting mirror 85 produces no differential output when the light beam is correctly focused on the disc.

Referring now to FIG. 22, there is shown a further embodiment of an automatic focusing device. In this embodiment, the differential photo-diode 87 is fixedly mounted independent of the movable reflecting mirror 85 and a third lens 91 is securely positioned between the second lens 86 and the differential photo-diode 87. The differential photo-diode 87 is arranged at the focus of the third lens 91. Accordingly, the focusing of the light beam on the disc 1 may be controlled by effecting the paralled displacement of the reflecting surface of the mirror 85 as indicated by the arrow thereon. Thus, whenever the light beam is correctly focused on the disc 1, the center of the spot of the reflected light beam is brought on the junction between the pair of photo-diodes due to the function of the third lens 91. If the light beam I' is brought in a focus on the disc 1 in a different position, the light beam runs in parallel with the beam I after being reflected by the second lens 86. Therefore, the light beam is condensed into the same spot which is symmetrical about the junction. To the contrary, should the light beam fail to focus on the disc 1, the light beam shall not run in parallel with the reflected beam I or I' and the light beam shall not be condensed symmetrically about the junction. Accordingly, when the disc 1 moves down from X to X', the reflecting mirror is driven from 85 to 85' by the differential output of the differential photo-diode 87.

Referring now to FIGS. 23 and 24, there is shown a still further embodiment of an automatic focusing device in which the light beam is shown by its beam axis. In FIG. 24, a half-mirror 92 which transmits a portion of an incident light beam P and reflects the remainder, has been omitted for drawing clarity. The half-mirror 92 constitutes the reflector mirror of a deflecting device similar to the light beam deflecting device as shown in FIG. 8 and is controlled by same manner as described above in connection with FIGS. 7 to 12. When the half-mirror 92 revolves in minute angles in directions of the arrow A and B to deflect the incident light beam respectively, both light beams P' and P" reflected by the half-mirror can be considered as light beams from the same source on the mirror.

In FIGS. 23, "T" is a point where the virtual image of the source on the half-mirror is focussed by the optical function of the disc and the lens 93 positioned between the disc and the half-mirror. "S" is a point where the image at point "T" is brought into a focus by a lens 94. At the point "S", a differential photo-diode is positioned. By such arrangement, the image of the source on the half-mirror is therefore focussed on the point "S" of the differential photo-diode by the optical function of the lens 93, the disc and lens 94. When the disc moves upwardly by a variation d1, the beam axis of reflected light beam is displaced from K to K' and the variation in distance—d1—appears as a spot at the point S. With such spot displacement, the differential photo-diode generates a differential output voltage which is then utilized to control the positioning of the lens 93 to focus the light beam properly on the disc. At the same time, the differential photo-diode also generates a total output which controls the rotational movement of the half-mirror for the purpose of exact tracking of the beam in the manner as previously described in connection with FIGS. 7 to 12. In this embodiment, the junction 90 of the differential photo-diode 87 is arranged vertically to the direction of the displacement of the beam spot. In contradistinction thereto, in the previously described first, second and third alternative embodiments of an automatic focusing device, when the junction 90a of the differential photo-diode 87 is made nonuniform, the output of the differential photo-diode 87 contains a noise value in its differential output because the beam spot moves on the junction lengthwise for the tracking control as shown in FIG. 25. However, in accord with the foregoing embodiment of FIGS. 23 and 24 of the same automatic focusing device, the output of the differential photo-diode does not contain a noise value in its differential output since the beam spot is always condensed at the same point on the junction. Accordingly, the differential output of the differential photo-diode is not influenced by the tracking control thereby to carry out the accurate focusing control.

As will now be apparent, the displacement effecting structure for the focusing lens assembly illustrated in FIG. 15 can be employed for effecting the necessary displacement of the lens 93 of the automatic focusing assembly illustrated in FIGS. 23 and 24 to properly refocus the light beam on the disc 1. In such case, the differential output voltage of the differential photo-diode may be processed by a circuit similar to that illustrated in FIG. 16 for application to the terminals 68. As will be likewise apparent, the focusing device, differential photo-diode and control circuitry are series connected and constitute a closed loop focusing control system.

Having thus described my invention, I claim:
1. An optical control system for information read out of video and/or audio information optically recorded in a track on the surface of a discshaped information medium comprising:

light beam generating means for projecting a unitary light beam onto a single track on the information medium to read information, means for focusing said unitary beam into a spot of predetermined transverse dimension at the locus of impingement thereof with the plane of said track and including an objective lens through which incident and reflected beams pass wherein the axes of said incident and reflected light beams deviate from the optical axis of said objective lens, means for selectively deflecting said unitary light beam transversely of the longitudinal axis of said track, photo-sensitive receptor means responsive to impingement of said reflected light beam after passing through said objective lens and adapted to provide at least a first output signal component selectively indicative of the nature and magnitude of transversely directed departures of said spot from a predetermined desired positional relationship thereof relative to a predetermined edge of said track and a second output signal component selectively indicative of the nature and magnitude of departures of said spot from said predetermined transverse dimension thereof at the locus of impingement thereof with said plane of said track induced by variation in spacing between said track and said objective lens, means responsive to said first signal component for selectively actuating said light beam deflecting means to return said spot into predetermined positional relation relative to the predetermined edge of said track, and means responsive to said second signal component for selectively actuating said focusing means to refocus said light beam into said spot of predetermined transverse dimension in impinging relation with the plane of said track.

2. An optical control system as set forth in claim 1, wherein said photo-sensitive receptor means comprises plural photo-sensitive surfaces on which said reflected light beam impinges and wherein said photo-sensitive surfaces are arranged to divide said reflected beam spot into the number of portions corresponding to the photo-sensitive surfaces so as to produce differential output signals as the second output signal indicative of the direction and magnitude of vertical displacement of said information medium, while said photo-sensitive surfaces detect the intensity of said reflected light beam impinged thereon to produce said first output signals.

3. An optical control system as set forth in claim 2, wherein said plural photo-sensitive surfaces are joined to provide a common linear junction by which said reflected beam spot thereon is divided into two adjacent areas and wherein said common junction is arranged to extend in the direction of passage of said reflected beam spot on said photo-sensitive surfaces through deflection of said unitary light beam by said deflecting means and in the direction substantially normal to the movement of said reflected beam spot in accordance with said vertical displacement of said information medium.

4. An optical control system as set forth in claim 2, wherein said objective lens of said focusing means is arranged controllable by means of said second output signal so as to be moved in the direction of the optical axis thereof in accordance with the variation in spacing between said track and said focusing means.

5. An optical control system as set forth in claim 4, comprising a further lens for shifting the direction of said reflected light beam and for restricting the movement of said reflected beam due to deflection by said deflecting means in the optical path from said beam generating means to said information medium so as to project the reflected beam on said photo-sensitive surfaces and wherein said reflected light beam reaching said photo-sensitive surfaces is not subjected to deflection by said deflecting means.

6. An optical control system as set forth in claim 5, wherein said deflecting means is constituted by a half-mirror through which said reflected light beam passes to be directed onto said photo-sensitive surfaces through the function of said further lens.

7. An optical control system as set forth in claim 6, wherein said further lens is arranged in the optical path of said reflected light beam from the information medium to said photo-sensitive surfaces so as to focus the image around the center of said deflecting means on said photo-sensitive surfaces at least in a direction parallel to a plane consisting of the axes of said deflected beams radially controlled during the deflections by said deflecting means.

8. An optical control system as set forth in claim 7, wherein said further lens is constituted by a convex lens for condensing the reflected light beam as the beam spot on said photo-sensitive surfaces of said detecting means.

* * * * *

UNITED STATES PATENT AND TRADEMARK OFFICE
CERTIFICATE OF CORRECTION

PATENT NO. : 4,165,519
DATED : August 21, 1979
INVENTOR(S) : Kenjiro Goto

It is certified that error appears in the above-identified patent and that said Letters Patent are hereby corrected as shown below:

The cover page of this patent should include the following:

--[30] Foreign Application Priority Data

January 30, 1973 [JP] Japan... 48-86657

Signed and Sealed this

Twenty-ninth Day of January 1980

[SEAL]

Attest:

SIDNEY A. DIAMOND

Attesting Officer  Commissioner of Patents and Trademarks